United States Patent Office 2,876,497
Patented Mar. 10, 1959

2,876,497

PROCESS OF MELT EXTRUDING PLASTIC FILM

Paul Alexander, Hinsdale, Ill., assignor, by mesne assignments, to Union Carbide Corporation, New York, N. Y., a corporation of New York No Drawing. Application April 14, 1955
Serial No. 501,429

14 Claims. (Cl. 18—57)

This invention relates to plastic film and method of making same. More particularly, it relates to polyvinyl chloride film and the method of making the same.

An object of this invention is to provide plastic film having new and improved characteristics.

Another object of this invention is to provide plastic film having markedly improved surface characteristics.

A further object of this invention is to provide a polyvinyl chloride film having markedly improved anti-blocking and surface slip characteristics.

An additional object of this invention is to provide a method of markedly improving the anti-blocking and surface slip characteristics of polyvinyl chloride film.

A specific object is to provide a method of producing polyvinyl chloride film having improved anti-blocking and surface slip characteristics.

Other and additional objects will appear hereafter.

The above objects are accomplished in general by a melt extruding process wherein the film forming composition, herein sometimes called stock, is supplied to the die in a plastic semi-fused state and as it passes through the die it is subjected to a flash heating to completely fuse and heat it to a molten state permitting drawing into a thin section as by blowing or stretching the film immediately upon leaving the die.

The flash heating results in the production of film having greater uniformity than when the flash heating is not used. It is obtained by having both lips of the die at a temperature at least 10° F. above that of the stock supplied thereto.

By the method of this invention, the time during which the composition is subjected to the flash heating is relatively short and thermal decomposition minimized. Films produced by this method are also characterized by good uniformity.

In the preferred embodiment, one of the lips is at a temperature lower than the other. In general, the difference in the temperatures of the lips of the die is at least 5° F. but can be up to 15° F. or more, and the temperature of the stock is at least 10° F. and can be up to 100° F. or more lower than the die lip having the lower temperature.

The surface of the film which contacted the die lip at the lower temperature is characterized by a matte finish which imparts markedly improved anti-blocking and surface slip properties to such surface.

In another embodiment, the temperature of both of the die lips is the same, and at least 10° F. higher than the stock delivered thereto. A film produced by this embodiment has improved surface gloss.

Any equipment employed for melt extrusion of thermoplastic compositions to form thin film can be used in this invention provided the temperature conditions herein set forth are utilized. When film in the form of seamless flattened tubing is desired, equipment such as set forth in U. S. Patent No. 2,461,975 can be used. In such embodiment, the inner or outer lip can be the one having the lower lip temperature depending on which surface the matte finish is desired. For producing film in the form of sheeting of indefinite length, known equipment utilizing slot orifices can be used.

Any melt-extrudable plastic film-forming composition can be used provided, of course, that the temperature of the stock delivered to the die lips is such as will permit melt extrusion without decomposition. In practice, the desired temperature of the stock at which it is to be delivered to the die is determined and the temperatures of the lips adjusted in accordance with this invention.

Film-forming compositions based on vinyl resins such as polyvinyl chloride, vinylidene chloride-vinyl chloride copolymer, vinyl chloride-vinyl acetate copolymer, vinylidene chloride-acrylonitrile copolymer, polyvinylidene chloride; cellulose esters such as cellulose acetate, cellulose-acetate butyrate; polyethylene; and polymonochlorotrifluoro ethylene are illustrative examples which can be used.

In the preferred embodiment polyvinyl chloride film-forming compositions such as disclosed in copending application Serial No. 501,424, filed on even date herewith, are used. Such polyvinyl chloride compositions contain plasticizer, heat stabilizer, wax additive and with or without anti-blocking agents. With a stock temperature within the range of 270°–370° F. satisfactory results have been obtained when the temperature of one of the die lips was within the range of 370°–410° F. or higher and that of the other die lip was within the range of 375° F.–420° F. or higher, it of course being understood that the temperature of both die lips was at least 10° F. higher than the stock and the temperature differential between the die lips was at least 5° F.

The details and manner of practicing the invention will be apparent from the following specific examples, it being understood that the examples are merely illustrative embodiments and the scope of the invention is not restricted thereto.

*Example 1*

A polyvinyl chloride film-forming composition containing plasticizer, heat stabilizer, wax additive and with or without anti-blocking agent such as disclosed in copending U. S. patent application Serial No. 501,424 is introduced into an extruder through which it is conveyed by a screw to a die having an annular orifice. The extruder is appropriately heated so that upon delivery to the lips of the die, the temperature of the stock will be within the range of 330°–370° F. The inner lip of the die is maintained at a temperature within the range of 380°–410° F. or higher and the outer lip is maintained at a temperature at least 10° F. higher than that of the inner lip and within the range of 390°–420° F. or higher. The tubing as it is being withdrawn from the die is blown by an entrapped bubble of a gaseous medium to the desired diameter, cooled, flattened, and finally wound up. The stock feed, die orifice, internal blowing of the tubing, cooling and rate of withdrawal of the tubing extruded from the die are correlated as well known in the art to produce seamless tubing having a wall thickness of 0.001 inch.

*Example 2*

Same as in Example 1 except that the following temperatures are used and the temperature of the outer die lip is at least 10° F. higher than that of the inner die lip:

|  | ° F. |
|---|---|
| Stock | 330–370 |
| Inner die lip | 385–400 |
| Outer die lip | 395–410 |

*Example 3*

Same as Example 1 except that the following temperatures are used and the temperature of the outer die lip is at least 10 degrees higher than that of the inner die lip:

|  | °F. |
|---|---|
| Stock | 345–355 |
| Inner die lip | 380–400 |
| Outer die lip | 390–410 |

*Example 4*

Same as Example 1 except that the following temperatures are used and the temperature of the outer die lip is at least 10 degrees higher than that of the inner die lip:

|  | °F. |
|---|---|
| Stock | 300–330 |
| Inner die lip | 370–390 |
| Outer die lip | 380–400 |

The interior surface of the flattened tubing produced by each of the foregoing examples was characterized by a matte finish which showed markedly improved surface slip and anti-blocking characteristics. Except for reducing the transparency of the film, the matte finish does not affect the other desirable properties of the film.

*Example 5*

Same as Example 1 except that the following temperatures are used and the temperature of both die lips is the same:

|  | °F. |
|---|---|
| Stock temperature | 345–355 |
| Inner die lip | 390–410 |
| Outer die lip | 390–410 |

Flattened tubing produced by this example was characterized by surfaces having improved gloss.

The invention is not restricted to film of any particular thickness. It can be used by appropriate adjustment of the film producing equipment to produce thin flexible durable self-sustaining unsupported film either in the form of flattened seamless tubing having a wall thickness of from 0.0005 to 0.005 inch or sheeting of indefinite length of a thickness from 0.0005 to 0.005 inch.

The invention can also be used in the production of coated materials. In this embodiment, the composition is extruded through a die under the temperature conditions hereinbefore described and the extruded product caused to adhere as a coating on a selected base material such as plastic films, regenerated cellulose films, paper, fabrics, metal foils and the like. The coating may be of any desired thickness. The precise thickness will depend on the desired properties of the coated material.

Herein the term "film" covers unsupported self-sustaining films and supported films (coated materials) as hereinbefore described.

The particular application to which film produced in accordance with this invention is applied depends on the composition thereof. Thus, if the film is to be used for the packaging of fatty foods such as meat loaves, smoked meat products, sausage, lard, pork sausage and similar products as well as dairy products, the components of the film can be as set out in the copending application hereinbefore referred to. In that embodiment of the invention wherein the film is in the form of a flattened seamless tubing in which the inner surface has the matte finish, the tubing will not internally block and it can be opened up very easily and the item inserted therein with great ease and facility.

In the embodiment wherein the film is in the form of sheeting or coated material of indefinite length, the film can be wound and unwound from rolls without blocking. Also, when such film is in the form of sheets, they can be stacked without blocking.

Since it is obvious that various changes and modifications can be made in the above description without departing from the nature and spirit thereof, this invention is not restricted thereto except as set forth in the appended claims.

I claim:

1. In a method of producing plastic film, the steps which comprise heating to a plastic semi-fused state a plastic film-forming composition, delivering said heated composition to a die orifice in which the temperatures of both of the die lips are higher than that of the composition delivered thereto and sufficient to completely fuse and heat the mass to a molten state, extruding the mass out of the die orifice in a molten state and drawing the molten mass into a thin section immediately upon leaving the die.

2. In a method as set forth in claim 1 wherein the die orifice is an annular orifice and the mass in the molten state is extruded in tubing form.

3. In a method as set forth in claim 1 wherein the die orifice is a slot orifice and the mass in the molten state is extruded in the form of sheeting.

4. In a method as set forth in claim 1 wherein the plastic film-forming composition is a vinyl chloride polymer.

5. In a method as set forth in claim 1 wherein one of the die lips is at a temperature at least 5° F. lower than that of the other die lip.

6. In a method as set forth in claim 1 wherein one of the die lips is at a temperature at least 5° F. lower than the other die lip and the temperature of the die lip having the lower temperature is at least 10° F. higher than that of the composition supplied thereto.

7. In a method as set forth in claim 1 wherein the temperatures of both of the die lips are the same and the temperature of the composition supplied thereto is at least 10° F. lower than that of said die lips.

8. In a method of producing polyvinyl chloride film, the steps which comprise heating to a plastic semi-fused state a polyvinyl chloride film-forming composition, delivering said heated composition in a plastic semi-fused state to a die orifice in which the temperature of the die lips are sufficient to completely fuse and heat the mass to a molten state as it passes therethrough and drawing the molten mass into a thin section immediately upon leaving the die orifice and in which the temperature of one of the die lips is at least 5° lower than the other under the following temperature conditions:

|  | °F. |
|---|---|
| Composition delivered to die | 270–370 |
| Inner die lip | 370–410 |
| Outer die lip | 375–420 |
| Temperature of composition being lower than that of die lip having lower temperature and with a minimum temperature differential of | 10 |

9. In a method as set forth in claim 8 wherein the die orifice is an annular orifice and the mass in the molten state is extruded in tubing form with the interior surface of the tubing having a matte finish.

10. In a method of producing polyvinyl chloride film, the steps which comprise heating to a plastic semi-fused state a polyvinyl chloride film forming composition, delivering said heated composition in a plastic semi-fused state to a die orifice in which the temperature of the die lips are sufficient to completely fuse and heat the mass to a molten state as it passes therethrough and drawing the molten mass into a thin section immediately upon leaving the die orifice and in which the temperature of one of the die lips is at least 10° lower than the other under the following temperature conditions:

|  | °F. |
|---|---|
| Composition | 330–370 |
| Inner die lip | 380–410 |
| Outer die lip | 390–420 |

11. In a method of producing polyvinyl chloride film, the steps which comprise heating to a plastic semi-fused state a polyvinyl chloride film forming composition, delivering said heated composition in a plastic semi-fused state to a die orifice in which the temperature of the die lips are sufficient to completely fuse and heat the mass to a molten state as it passes therethrough and drawing the molten mass into a thin section immediately upon leaving the die orifice and in which the temperature of one of the die lips is at least 10° F. lower than the other under the following temperature conditions:

| | ° F. |
|---|---|
| Composition | 330–370 |
| Inner die lip | 385–400 |
| Outer die lip | 395–410 |

12. In a method of producing polyvinyl chloride film, the steps which comprise heating to a plastic semi-fused state a polyvinyl chloride film forming composition, delivering said heated composition in a plastic semi-fused state to a die orifice in which the temperature of the die lips are sufficient to completely fuse and heat the mass to a molten state as it passes therethrough and drawing the molten mass into a thin section immediately upon leaving the die orifice and in which the temperature of one of the die lips is at least 10° F. lower than the other under the following temperature conditions:

| | ° F. |
|---|---|
| Composition | 345–355 |
| Inner die lip | 380–400 |
| Outer die lip | 390–410 |

13. In a method of producing polyvinyl chloride film, the steps which comprise heating to a plastic semi-fused state a polyvinyl chloride film forming composition, delivering said heated composition in a plastic semi-fused state to a die orifice in which the temperature of the die lips are sufficient to completely fuse and heat the mass to a molten state as it passes therethrough and drawing the molten mass into a thin section immediately upon leaving the die orifice and in which the temperature of one of the die lips is at least 10° F. lower than the other under the following temperature conditions:

| | ° F. |
|---|---|
| Composition | 300–330 |
| Inner die lip | 370–390 |
| Outer die lip | 380–400 |

14. In a method of producing polyvinyl chloride film, the steps which comprise heating to a plastic semi-fused state a polyvinyl chloride film forming composition, delivering said heated composition in a plastic semi-fused state to a die orifice in which the temperature of the die lips are sufficient to completely fuse and heat the mass to a molten state as it passes therethrough and drawing the molten mass into a thin section immediately upon leaving the die orifice and in which the temperature of the die lips is the same under the following temperature conditions:

| | ° F. |
|---|---|
| Composition | 345–355 |
| Inner die lip | 390–410 |
| Outer die lip | 390–410 |

References Cited in the file of this patent

UNITED STATES PATENTS

| 2,328,125 | Buchsbaum et al. | Aug. 31, 1943 |
| 2,330,282 | Hazeltine et al. | Sept. 28, 1943 |
| 2,544,763 | Montero | Mar. 13, 1951 |
| 2,698,463 | Conwell et al. | Jan. 4, 1955 |
| 2,702,408 | Hartland | Feb. 22, 1955 |
| 2,779,053 | Longstreth et al. | Jan. 29, 1957 |